(12) United States Patent
Marten

(10) Patent No.: US 12,284,410 B2
(45) Date of Patent: *Apr. 22, 2025

(54) FACILITATING WATCH PARTIES

(71) Applicant: DISH Network L.L.C., Englewood, CO (US)

(72) Inventor: Neil Marten, Lakewood, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,241

(22) Filed: Oct. 10, 2023

(65) Prior Publication Data

US 2024/0040178 A1 Feb. 1, 2024

Related U.S. Application Data

(63) Continuation of application No. 16/801,277, filed on Feb. 26, 2020, now Pat. No. 11,838,450.

(51) Int. Cl.
*H04N 21/2662* (2011.01)
*H04N 21/262* (2011.01)
*H04N 21/43* (2011.01)

(52) U.S. Cl.
CPC ..... *H04N 21/2662* (2013.01); *H04N 21/2625* (2013.01); *H04N 21/4307* (2013.01)

(58) Field of Classification Search
CPC ......... H04N 21/2662; H04N 21/43076; H04N 21/4307; H04N 21/242; H04L 65/752; H04L 65/762

See application file for complete search history.

(56) References Cited

U.S. PATENT DOCUMENTS 6,081,830 A 6/2000 Schindler
6,237,025 B1 5/2001 Ludwig et al.
(Continued)

FOREIGN PATENT DOCUMENTS

CN 103290360 B 3/2016
CN 110430457 A 11/2019
(Continued)

OTHER PUBLICATIONS

M. O. van Deventer, H. Stokking, M. Hammond, J. Le Feuvre and p. Cesar, "Standards for multi-stream and multi-device media synchronization," in IEEE Communications Magazine, vol. 54, No. 3, pp. 16-21, Mar. 2016, doi: 10.1109/MCOM.2016.7432166. (Year: 2016).*

(Continued)

*Primary Examiner* — Alex H. Tran
(74) *Attorney, Agent, or Firm* — Wash Park IP Ltd.; John T Kennedy

(57) ABSTRACT

Devices, systems and processes for facilitating watch parties are described. For at least one embodiment, a system may include a sync server; a first user device communicatively coupled to the sync server; a second user device communicatively coupled to the sync server; and a content source providing a content. The sync server may transmit the content as each of a first content to the first user device and as a second content to the second user device. The sync server may be configured to adjust a first bit rate for the first content and, upon adjusting the first bit rate, the first content and second content may be respectively provided to each of the first user device and the second user device such that the devices can substantially simultaneously and separately present the first content to the first user and the second content to the second user.

13 Claims, 5 Drawing Sheets

(56) References Cited

U.S. PATENT DOCUMENTS

| | | | |
|---|---|---|---|
| 6,256,663 B1 | 7/2001 | Davis | |
| 6,392,664 B1 | 5/2002 | White et al. | |
| 6,519,771 B1 | 2/2003 | Zenith | |
| 6,643,291 B1 | 11/2003 | Yoshihara et al. | |
| 6,646,673 B2 | 11/2003 | Caviedes et al. | |
| 6,754,904 B1 | 6/2004 | Cooper et al. | |
| 7,053,915 B1 | 5/2006 | Jung et al. | |
| 7,143,428 B1 | 11/2006 | Bruck et al. | |
| 8,015,306 B2 | 9/2011 | Bowman | |
| 8,046,411 B2 | 10/2011 | Hayashi et al. | |
| 8,046,801 B2 | 10/2011 | Ellis et al. | |
| 8,223,185 B2* | 7/2012 | Gratton | H04H 60/80 |
| | | | 715/753 |
| 8,316,400 B1 | 11/2012 | Kravets | |
| 9,015,306 B2 | 4/2015 | Dupre et al. | |
| 9,226,011 B2 | 12/2015 | Francisco | |
| 9,252,950 B2* | 2/2016 | Caspi | H04L 63/0807 |
| 9,378,474 B1 | 6/2016 | Story, Jr. et al. | |
| 9,471,809 B2 | 10/2016 | Garrett et al. | |
| 9,544,624 B2 | 1/2017 | VanDuyn et al. | |
| 9,654,817 B2 | 5/2017 | Li et al. | |
| 10,135,887 B1* | 11/2018 | Esser | H04L 65/612 |
| 10,158,917 B1 | 12/2018 | Logan et al. | |
| 10,187,690 B1 | 1/2019 | Garcia et al. | |
| 10,194,184 B2* | 1/2019 | Amento | H04N 21/812 |
| 10,237,587 B2 | 3/2019 | Zanabria et al. | |
| 10,536,741 B1* | 1/2020 | Madison | H04N 21/8456 |
| 10,575,042 B2 | 2/2020 | Rennison et al. | |
| 10,735,825 B1* | 8/2020 | Comito | H04N 21/6547 |
| 10,757,366 B1 | 8/2020 | Kwatra et al. | |
| 10,757,467 B1 | 8/2020 | Katz et al. | |
| 10,762,474 B2 | 9/2020 | Frank et al. | |
| 10,819,758 B1* | 10/2020 | Krutsch | H04L 65/762 |
| 10,820,060 B1 | 10/2020 | Bosworth | |
| 10,855,763 B2* | 12/2020 | Birrer | H04N 21/8547 |
| 10,939,148 B2* | 3/2021 | Sun | H04N 21/2393 |
| 11,019,113 B2 | 5/2021 | Kurata et al. | |
| 11,051,059 B2* | 6/2021 | Dodson | H04N 21/6543 |
| 11,082,467 B1 | 8/2021 | Hartnett et al. | |
| 11,128,916 B2* | 9/2021 | Mayhew | H04L 65/75 |
| 11,166,065 B1* | 11/2021 | Camargo | H04N 21/4318 |
| 11,206,462 B2 | 12/2021 | Strickland | |
| 11,259,069 B1* | 2/2022 | Hsieh | H04N 21/414 |
| 11,303,947 B2* | 4/2022 | Bertolami | H04N 21/2387 |
| 11,477,516 B2 | 10/2022 | Yoden | |
| 11,502,864 B2 | 11/2022 | Moorefield et al. | |
| 11,503,090 B2 | 11/2022 | Wilkins et al. | |
| 11,509,726 B2 | 11/2022 | Alsina et al. | |
| 11,553,159 B1 | 1/2023 | Rothschild et al. | |
| 11,570,218 B1 | 1/2023 | Roberts et al. | |
| 11,588,869 B2 | 2/2023 | Gratton et al. | |
| 11,606,597 B2 | 3/2023 | Iyer et al. | |
| 11,695,722 B2 | 7/2023 | Madduluri et al. | |
| 11,758,245 B2 | 9/2023 | Marten | |
| 11,762,917 B2 | 9/2023 | Frank et al. | |
| 2002/0067909 A1 | 6/2002 | Iivonen | |
| 2003/0009766 A1 | 1/2003 | Marolda | |
| 2003/0097655 A1 | 5/2003 | Novak | |
| 2003/0149988 A1 | 8/2003 | Ellis et al. | |
| 2003/0229900 A1 | 12/2003 | Reisman | |
| 2004/0154040 A1 | 8/2004 | Ellis | |
| 2004/0205811 A1 | 10/2004 | Grandy et al. | |
| 2005/0204387 A1 | 9/2005 | Knudson et al. | |
| 2005/0262542 A1 | 11/2005 | DeWeese et al. | |
| 2006/0013208 A1 | 1/2006 | Rietschel et al. | |
| 2006/0101022 A1 | 5/2006 | Yu et al. | |
| 2006/0149850 A1 | 7/2006 | Bowman | |
| 2006/0161621 A1 | 7/2006 | Rosenberg | |
| 2006/0174312 A1 | 8/2006 | Ducheneaut et al. | |
| 2006/0236352 A1 | 10/2006 | Scott | |
| 2006/0271960 A1* | 11/2006 | Jacoby | H04N 21/258 |
| | | | 348/E7.071 |
| 2007/0157281 A1 | 7/2007 | Ellis et al. | |
| 2007/0229651 A1 | 10/2007 | Nakajima | |
| 2007/0283380 A1 | 12/2007 | Aoki et al. | |
| 2008/0037785 A1 | 2/2008 | Gantman et al. | |
| 2008/0163285 A1 | 7/2008 | Tanaka et al. | |
| 2009/0063983 A1 | 3/2009 | Amidon et al. | |
| 2009/0089840 A1 | 4/2009 | Shusman | |
| 2009/0167839 A1 | 7/2009 | Ottmar | |
| 2009/0205008 A1 | 8/2009 | Wollmershauser et al. | |
| 2009/0249223 A1 | 10/2009 | Barsook et al. | |
| 2009/0319885 A1 | 12/2009 | Amento et al. | |
| 2009/0327428 A1 | 12/2009 | Ramanathan et al. | |
| 2010/0066804 A1 | 3/2010 | Shoemake et al. | |
| 2010/0111491 A1 | 5/2010 | Kamoto | |
| 2010/0153885 A1 | 6/2010 | Yates | |
| 2010/0257280 A1 | 10/2010 | Stokking et al. | |
| 2010/0281108 A1 | 11/2010 | Cohen | |
| 2010/0306671 A1 | 12/2010 | Mattingly et al. | |
| 2011/0016172 A1 | 1/2011 | Shah | |
| 2011/0069940 A1 | 3/2011 | Shimy et al. | |
| 2011/0154417 A1 | 6/2011 | Civanlar et al. | |
| 2011/0219307 A1 | 9/2011 | Mate et al. | |
| 2011/0246908 A1* | 10/2011 | Akram | H04N 21/4788 |
| | | | 715/752 |
| 2012/0131110 A1* | 5/2012 | Buyukkoc | H04N 21/43076 |
| | | | 709/248 |
| 2012/0151345 A1 | 6/2012 | McClements, IV | |
| 2012/0216300 A1 | 8/2012 | Vivolo et al. | |
| 2012/0218262 A1 | 8/2012 | Yomdin et al. | |
| 2012/0246679 A1* | 9/2012 | Chen | H04N 21/4788 |
| | | | 725/38 |
| 2012/0296972 A1 | 11/2012 | Backer | |
| 2013/0016955 A1 | 1/2013 | Pejaver | |
| 2013/0031192 A1 | 1/2013 | Caspi | |
| 2013/0058632 A1 | 3/2013 | Jackson | |
| 2013/0103814 A1 | 4/2013 | Carrasco et al. | |
| 2013/0170818 A1 | 7/2013 | Klappert et al. | |
| 2013/0173765 A1 | 7/2013 | Korbecki | |
| 2014/0068692 A1 | 3/2014 | Archibong et al. | |
| 2014/0071344 A1 | 3/2014 | Francisco | |
| 2014/0096167 A1 | 4/2014 | Lang et al. | |
| 2014/0150002 A1 | 5/2014 | Hough et al. | |
| 2014/0195675 A1* | 7/2014 | Silver | H04L 65/1083 |
| | | | 709/224 |
| 2014/0205261 A1 | 7/2014 | Courtemanche | |
| 2014/0269757 A1 | 9/2014 | Park et al. | |
| 2014/0325557 A1 | 10/2014 | Evans et al. | |
| 2015/0037777 A1 | 2/2015 | Kushner | |
| 2015/0052571 A1 | 2/2015 | Stokking et al. | |
| 2015/0106360 A1 | 4/2015 | Cao et al. | |
| 2015/0110471 A1 | 4/2015 | Zheng | |
| 2015/0172338 A1 | 6/2015 | Moran et al. | |
| 2015/0215352 A1 | 7/2015 | Wong et al. | |
| 2015/0230004 A1 | 8/2015 | VanDuyn et al. | |
| 2015/0245106 A1 | 8/2015 | Tian | |
| 2015/0327024 A1 | 11/2015 | Yang et al. | |
| 2016/0006981 A1 | 1/2016 | Bauman et al. | |
| 2016/0021153 A1 | 1/2016 | Hull et al. | |
| 2016/0044622 A1 | 2/2016 | Crowe et al. | |
| 2016/0050160 A1 | 2/2016 | Li et al. | |
| 2016/0182928 A1* | 6/2016 | Francisco | H04N 21/4305 |
| | | | 725/116 |
| 2016/0241652 A1 | 8/2016 | Frazier et al. | |
| 2016/0255041 A1 | 9/2016 | Lew et al. | |
| 2016/0294894 A1 | 10/2016 | Miller | |
| 2016/0366203 A1 | 12/2016 | Blong et al. | |
| 2017/0006322 A1 | 1/2017 | Dury et al. | |
| 2017/0093769 A1* | 3/2017 | Lind | G06F 3/1454 |
| 2017/0103664 A1 | 4/2017 | Wong et al. | |
| 2017/0163411 A1 | 6/2017 | Van Den Berghe | |
| 2017/0264920 A1 | 9/2017 | Mickelsen | |
| 2017/0312626 A1 | 11/2017 | Colenbrander | |
| 2017/0346926 A1 | 11/2017 | Charters et al. | |
| 2018/0035136 A1 | 2/2018 | Crowe | |
| 2018/0131681 A1 | 5/2018 | Husser | |
| 2018/0167427 A1 | 6/2018 | Kedenburg, III | |
| 2018/0192000 A1 | 7/2018 | Mercredi et al. | |
| 2018/0279007 A1 | 9/2018 | Peterson et al. | |
| 2018/0288467 A1 | 10/2018 | Holmberg et al. | |
| 2018/0316939 A1* | 11/2018 | Todd | H04N 21/21805 |
| 2018/0330756 A1 | 11/2018 | MacDonald | |
| 2018/0365232 A1 | 12/2018 | Lewis et al. | |

(56) References Cited

U.S. PATENT DOCUMENTS

| | | | |
|---|---|---|---|
| 2019/0124159 A1 | 4/2019 | Alsina et al. | |
| 2019/0147841 A1 | 5/2019 | Zatepyakin et al. | |
| 2019/0155934 A1 | 5/2019 | Delaney et al. | |
| 2019/0179610 A1 | 6/2019 | Aiken et al. | |
| 2019/0200054 A1 | 6/2019 | Dharmaji | |
| 2019/0253742 A1* | 8/2019 | Garten | H04N 21/251 |
| 2019/0303874 A1 | 10/2019 | Yang et al. | |
| 2019/0321720 A1 | 10/2019 | Nomura et al. | |
| 2020/0029117 A1 | 1/2020 | Kalva et al. | |
| 2020/0053312 A1 | 2/2020 | Mukherjee et al. | |
| 2020/0112753 A1* | 4/2020 | Stockhammer | H04N 21/23439 |
| 2020/0275149 A1 | 8/2020 | Su et al. | |
| 2020/0402541 A1 | 12/2020 | Talbot et al. | |
| 2021/0001236 A1 | 1/2021 | Srinivasan | |
| 2021/0006864 A1 | 1/2021 | Xu et al. | |
| 2021/0035559 A1 | 2/2021 | Xu | |
| 2021/0036979 A1 | 2/2021 | Madduluri et al. | |
| 2021/0037290 A1 | 2/2021 | Madduluri | |
| 2021/0037295 A1* | 2/2021 | Strickland | H04N 21/435 |
| 2021/0051034 A1 | 2/2021 | Jonas et al. | |
| 2021/0266621 A1 | 8/2021 | Marten | |
| 2021/0321159 A1 | 10/2021 | Aggarwal et al. | |
| 2022/0029825 A1 | 1/2022 | Uhr et al. | |
| 2022/0040816 A1 | 2/2022 | Eckel et al. | |
| 2022/0066621 A1 | 3/2022 | Appelbaum et al. | |
| 2022/0070524 A1 | 3/2022 | Tyer et al. | |
| 2022/0103873 A1 | 3/2022 | Yoshida et al. | |
| 2022/0132214 A1* | 4/2022 | Felman | H04N 21/278 |
| 2022/0141500 A1 | 5/2022 | Du | |
| 2022/0166815 A1 | 5/2022 | Gratton et al. | |
| 2022/0174357 A1 | 6/2022 | Zavesky et al. | |
| 2022/0224659 A1 | 7/2022 | Ghazzal | |
| 2022/0256231 A1* | 8/2022 | Eniwumide | H04N 21/816 |
| 2022/0311725 A1 | 9/2022 | Madduluri et al. | |
| 2022/0377413 A1 | 11/2022 | Lidaka et al. | |
| 2022/0394328 A1 | 12/2022 | Marten | |
| 2022/0408161 A1 | 12/2022 | Garten | |
| 2023/0007342 A1 | 1/2023 | Shah et al. | |
| 2023/0145338 A1 | 5/2023 | Iyer et al. | |
| 2023/0147705 A1 | 5/2023 | Huertas et al. | |
| 2023/0179822 A1 | 6/2023 | Marten et al. | |
| 2023/0179823 A1 | 6/2023 | Marten et al. | |
| 2023/0179825 A1 | 6/2023 | Drennan et al. | |
| 2023/0214780 A1 | 7/2023 | Fong et al. | |
| 2023/0362461 A1 | 11/2023 | Marten | |
| 2024/0064355 A1 | 2/2024 | Marten | |
| 2024/0064356 A1 | 2/2024 | Marten | |
| 2024/0291791 A1 | 8/2024 | Madduluri et al. | |

FOREIGN PATENT DOCUMENTS

| | | | |
|---|---|---|---|
| CN | 110430457 B * | 9/2021 | H04L 43/0852 |
| IN | 202041037988 | 9/2020 | |
| WO | PCTIB2021057835 | 8/2021 | |
| WO | 2022049466 A1 | 3/2022 | |

OTHER PUBLICATIONS

U.S. Appl. No. 17/543,852, Non-Final Office Action, Dec. 5, 2022.
U.S. Appl. No. 17/543,852, Notice of Allowance, Sep. 8, 2023.
U.S. Appl. No. 17/543,852, RCE and Response to Non-Final Office Action, Aug. 22, 2023.
U.S. Appl. No. 17/543,852, Response to Non-Final Office Action, Apr. 3, 2023.
U.S. Appl. No. 17/543,886, filed, Dec. 7, 2021.
U.S. Appl. No. 17/543,886, Final Office Action, May 25, 2023.
U.S. Appl. No. 17/543,886, non-final Office Action, Sep. 14, 2023.
U.S. Appl. No. 17/543,886, Non-Final Office Action, Dec. 19, 2022.
U.S. Appl. No. 17/543,886, RCE and Response to Final Office Action, Aug. 21, 2023.
U.S. Appl. No. 17/543,886, Response to Non-Final Office Action, Apr. 5, 2023.
U.S. Appl. No. 17/543,925, filed Dec. 7, 2021.
U.S. Appl. No. 17/543,925, Final Office Action, Jul. 7, 2023.
U.S. Appl. No. 17/543,925, Non-final Office Action Response, May 29, 2023.
U.S. Appl. No. 17/543,925, Non-final Office Action, Jan. 31, 2023.
U.S. Appl. No. 17/543,925, Notice of Allowance and Examiner Interview Summary, Jul. 27, 2023.
U.S. Appl. No. 17/543,925, Response to Final Office Action and eTerminal Disclaimer, Jul. 8, 2023.
U.S. Appl. No. 17/840,966, filed Jun. 15, 2022.
U.S. Appl. No. 17/891,939, filed Aug. 19, 2022.
U.S. Appl. No. 17/891,939, Examiner Interview Summary, Jun. 8, 2023.
U.S. Appl. No. 17/891,939, Amendment and Examiner Initiated Interview Summary, May 31, 2023.
U.S. Appl. No. 17/891,939, Notice of Allowance, Jun. 8, 2023.
U.S. Appl. No. 18/094,369, Non-Final Office Action, Jun. 8, 2023.
U.S. Appl. No. 18/094,369, Response to non-final Office Action with Terminal Disclaimer, Aug. 22, 2023.
U.S. Appl. No. 18/222,453, Continuation application as filed, Jul. 16, 2023.
U.S. Appl. No. 18/314,987, Application as filed May 10, 2023.
U.S. Appl. No. 18/314,987, Non-Final Office Action, Sep. 13, 2023.
U.S. Appl. No. 18/363,897, filed Aug. 2, 2023.
U.S. Appl. No. 18/484,241, Application filed, Oct. 10, 2023.
U.S. Appl. No. 17/336,416, Non-Final Office Action Response, Oct. 23, 2023.
U.S. Appl. No. 18/222,453, Notice of Publication, Nov. 9, 2023.
U.S. Appl. No. 17/087,815, filed Nov. 3, 2020, Satish Balasubramanian Iyer.
U.S. Appl. No. 17/336,416, filed Jun. 2, 2021, Neil Marten.
U.S. Appl. No. 17/376,459, filed Jul. 15, 2021, Neil Marten.
U.S. Appl. No. 17/543,852, filed Dec. 7, 2021, Ross Alan Drennan.
U.S. Appl. No. 17/543,886, filed Dec. 7, 2021, Neil Marten.
U.S. Appl. No. 17/543,925, filed Dec. 7, 2021, Neil Marten.
U.S. Appl. No. 17/840,966, filed Jun. 15, 2022, Ram Madduluri.
U.S. Appl. No. 17/891,939, filed Aug. 19, 2022, Neil Marten.
U.S. Appl. No. 18/222,453, filed Jul. 16, 2023, Neil Marten.
U.S. Appl. No. 18/363,897, filed Aug. 2, 2023, Neil Marten.
"Be anyone and reface anything"—downloaded from the Internet on Nov. 3, 2021 from https://hey.reface.ai/.
A. Colaco, I. Kim and C. Schmandt, "Back Talk: An auditory environment for sociable television viewing," 2011 IEEE Consumer Communications and Networking Conference (CCNC), 2011, pp. 352-356, doi: 10.1109/CCNC.2011.5766489. (Year: 2011).
ATSC Standard: ATSC 3.0 System, Doc. A/300:2019, Sep. 17, 2019.
DeepFace Lab for Windows, downloaded from the Internet on Nov. 3, 2021 from https://deepfacelab.en.softonic.com/.
Faceswap, downloaded from the Internet on Nov. 3, 2021 from https://faceswap.dev/.
Family Fun with Deepfakes . . . , downloaded from the Internet on Oct. 23, 2021, from https://towardsdatascience.com/family-fun-with-deepfakes-or-how-i-got-my-wife-onto-the-tonight-show-a4554775c011.
IN-202041037988.
M. 0. van Deventer, H. Stokking, M. Hammond, J. Le Feuvre and P. Cesar, "Standards for multi-stream and multi-device media synchronization," in IEEE Communications Magazine, vol. 54, No. 3, pp. 16-21, Mar. 2016, doi: 10.1109/MCOM.2016.7432166. (Year: 2016).
PCT/IB2021/057835, Int'l Search Report and Written Opinion, Jan. 27, 2022.
PCT/IB2021/057835, Invitation to pay Additional Fees and Preliminary International Search Results.
U.S. Appl. No. 18/094,369, filed Jan. 8, 2023.
U.S. Appl. No. 15/788,058, Request for Continued Examination, Amendment and IDS, Nov. 3, 2022.
U.S. Appl. No. 15/788,058, NTC Appeal with Pre-Appeal Brief Conference Request, Sep. 7, 2022.
U.S. Appl. No. 15/788,058, Notice of Allowance Nov. 30, 2022.
U.S. Appl. No. 15/788,058, Prosecution History through Jul. 19, 2022.
U.S. Appl. No. 16/706,686, filed Dec. 7, 2019.

(56) References Cited

OTHER PUBLICATIONS

U.S. Appl. No. 16/706,686, Non-Final Office Action, Mailed May 12, 2021.
U.S. Appl. No. 16/706,686, filed Dec. 7, 2019, prosecution history.
U.S. Appl. No. 16/706,764, Non-Final Office Action, Jun. 10, 2021.
U.S. Appl. No. 16/706,764, filed Dec. 8, 2019.
U.S. Appl. No. 16/706,764, Issue Fee Paid, Jun. 15, 2022.
U.S. Appl. No. 16/706,764, Non-Final Office Action Response, Sep. 7, 2021.
U.S. Appl. No. 16/706,764, Notice of Allowability, May 11, 2023.
U.S. Appl. No. 16/706,764, Notice of Allowance, Mar. 17, 2022.
U.S. Appl. No. 16/706,764, NTC Allowance, Sep. 8, 2022.
U.S. Appl. No. 16/706,764, Prosecution Reopened, Jan. 4, 2023.
U.S. Appl. No. 16/706,764, RCE, Jul. 19, 2022.
U.S. Appl. No. 17/087,815, filed Nov. 3, 2020.
U.S. Appl. No. 17/087,815, Non-Final Office Action, dated Feb. 24, 2022.
U.S. Appl. No. 17/087,815, Notice of Allowability Sep. 9, 2022.
U.S. Appl. No. 17/087,815, Notice of Allowance, Sep. 1, 2022.
U.S. Appl. No. 17/087,815, Response to Non-Final Office Action, May 23, 2022.
U.S. Appl. No. 17/336,416, filed Jun. 2, 2021.
U.S. Appl. No. 17/336,416, Final Office Action, Jan. 9, 2022.
U.S. Appl. No. 17/336,416, Non-final Office Action, Jun. 16, 2022.
U.S. Appl. No. 17/336,416, RCE and Response to Final Office Action, Apr. 4, 2023.
U.S. Appl. No. 17/336,416, Response to Non-final Office Action, Sep. 12, 2022.
U.S. Appl. No. 17/336,416, Non-Final Office Action, Jul. 28, 2023.
U.S. Appl. No. 17/376,459, filed Jul. 15, 2021.
U.S. Appl. No. 17/376,459, Final Office Action, Dec. 1, 2022.
U.S. Appl. No. 17/376,459, Final Office Action, May 2, 2022.
U.S. Appl. No. 17/376,459, Non-final Office Action, Jul. 29, 2022.
U.S. Appl. No. 17/376,459, Non-Final Office Action, mailed Dec. 17, 2021.
U.S. Appl. No. 17/376,459, Notice of Allowance, Apr. 24, 2023.
U.S. Appl. No. 17/376,459, RCE and Response to Final Office Action, Jul. 5, 2022.
U.S. Appl. No. 17/376,459, Response to Final Office Action, Mar. 29, 2023.
U.S. Appl. No. 17/376,459, Response to Non-final Office Action, Oct. 11, 2022.
U.S. Appl. No. 17/376,459, Response to Non-final Office Action, dated Mar. 5, 2022.
U.S. Appl. No. 17/543,852, filed Dec. 7, 2021.
U.S. Appl. No. 17/543,852, Final Office Action, May 26, 2022.
U.S. Appl. No. 17/840,966, Non-Final Office Action, Oct. 19, 2023.
U.S. Appl. No. 18/094,369, Final Office Action, Nov. 29, 2023.
U.S. Appl. No. 18/314,987, Applicant Initiated Interview Summary, dated Nov. 17, 2023.
U.S. Appl. No. 17/336,416, Final Office Action, Dec. 22, 2023.
U.S. Appl. No. 17/336,416, Response to Final Office Action, Jan. 9, 2024.
U.S. Appl. No. 17/543,886, Response to non-final Office Action, Jan. 5, 2024.
U.S. Appl. No. 17/840,966, Response to non-final Office Action, Jan. 5, 2024.
U.S. Appl. No. 18/314,987, Response to Non-Final Ofice Action, dated Dec. 13, 2023.
U.S. Appl. No. 17/336,416, Advisory Action, Jan. 29, 2024.
U.S. Appl. No. 17/336,416, RCE, Jan. 29, 2024.
U.S. Appl. No. 17/336,416, Non-Final Office Action, Feb. 22, 2024.
U.S. Appl. No. 17/543,886, Final Office Action, Feb. 15, 2024.
U.S. Appl. No. 18/094,369, Notice of Allowance, Feb. 14, 2024.
U.S. Appl. No. 18/094,369, Response to Final Office Action, Jan. 27, 2024.
U.S. Appl. No. 17/336,416, Response to Non-Final Office Action, May 3, 2024.
U.S. Appl. No. 18/657,624, filed May 7, 2024.
U.S. Appl. No. 17/336,416, Final Office Action, Jun. 20, 2024.
U.S. Appl. No. 17/336,416, RCE and Response to Final Office Action, Aug. 13, 2024.
U.S. Appl. No. 18/657,624, Application as published, Aug. 29, 2024.
U.S. Appl. No. 18/363,897, Non-Final Office Action, Aug. 8, 2024.
U.S. Appl. No. 18/222,453, Non-final Office Action Response and Terminal Disclaimer, Dec. 3, 2024 (Available at USPTO Patent Center).
U.S. Appl. No. 18/222,453, Non-final Office Action, Nov. 19, 2024 (Available at USPTO Patent Center).
U.S. Appl. No. 17/336,416, Examiner Initiated Claim Amedments and & Interview Summary, Jan. 31, 2025 (Available at USPTO Patent Center).
U.S. Appl. No. 18/222,453, Notice of Allowance, Jan. 15, 2025 (Available at USPTO Patent Center).
U.S. Appl. No. 17/336,416, Notice of Allowance and Examiner Interview Summary, Feb. 20, 2025 (Available at USPTO Patent Center).
U.S. Appl. No. 18/363,897, Notice of Abandonment, Feb. 14, 2025 (Available at USPTO Patent Center).
U.S. Appl. No. 19/065,276, Application filed, Feb. 27, 2025 (Available at USPTO Patent Center).

* cited by examiner

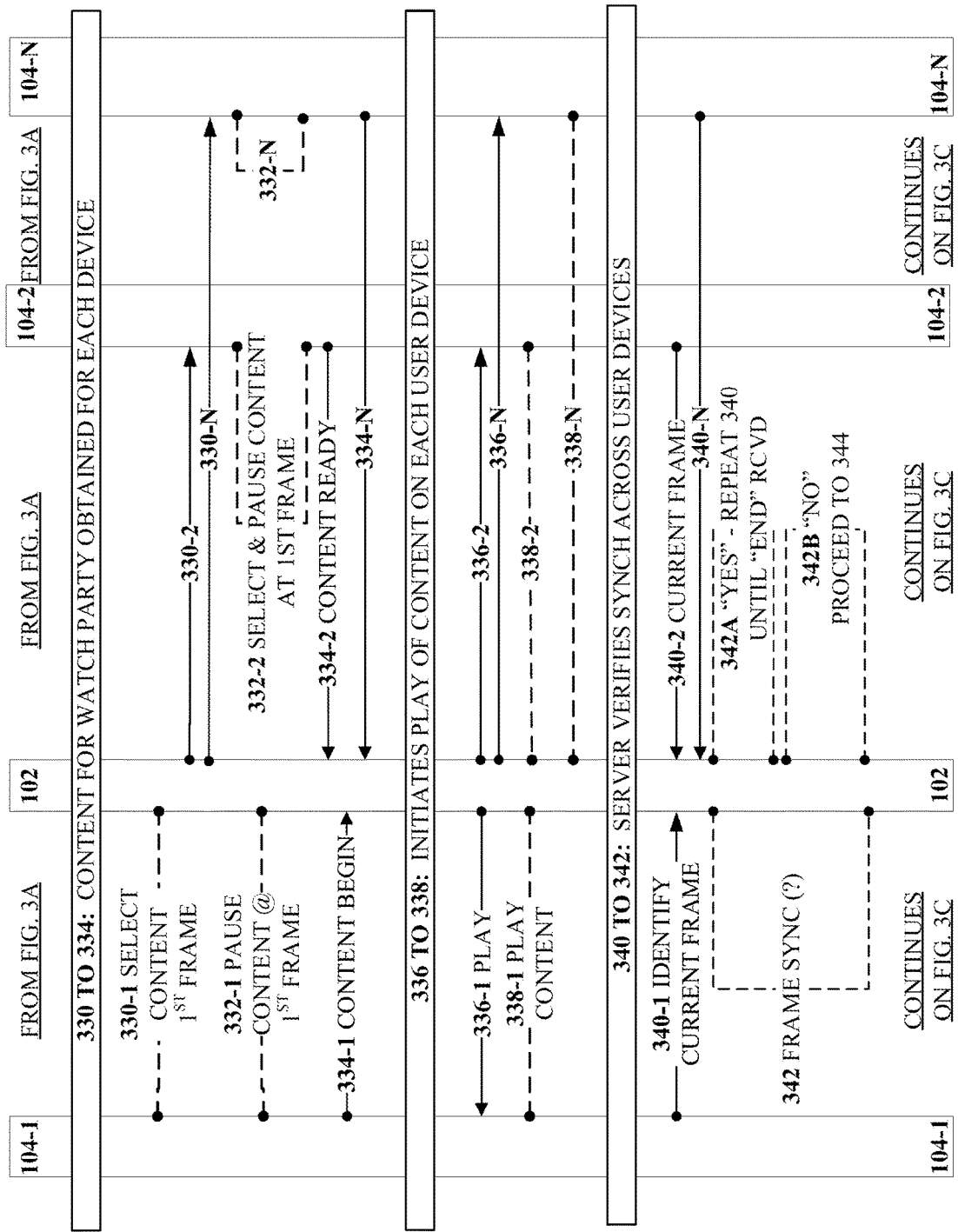

FACILITATING WATCH PARTIES

CROSS-REFERENCE TO RELATED APPLICATIONS

This application is a Continuation Application of and claims priority to U.S. patent application Ser. No. 16/801,277, filed on 26 Feb. 2020, in the name of inventor Neil Marten, and entitled "Devices, Systems and Processes for Facilitating Watch Parties" (herein "the '277 Application"). The entire contents of the '277 Application are incorporated herein by reference.

TECHNICAL FIELD

The technology described herein generally relates to devices, systems, and processes for facilitating watch parties.

BACKGROUND

Various devices, systems and processes today enable a person to be presented with content, such as a football game, television show, video game, soundtrack, or the like using a presentation device. Such content may be presented to a user in a humanly perceptible format, such as visually, audibly, as vibrations, combinations of the foregoing, or otherwise. Often a first user desires to be presented with such content at substantially the same time as another, second user. The second user may be physically located remotely to the first user, such as in another building, city, state, country or otherwise. The first user and the second user may desire to receive such content and, together participate in the reception of such content, include the sharing of their reactions to such content with each other at substantially the same time as the content is presented to each of the users.

Yet, today, devices, systems and processes for facilitating such substantially simultaneous presentation of a given content and user reactions thereto to multiple, geographically dispersed users are inadequate. The various embodiments of the present disclosure address such inadequacies.

SUMMARY

The various embodiments of the present disclosure describe devices, systems, and processes for facilitating "watch parties."

In accordance with at least one embodiment of the present disclosure a system for facilitating watch parties may include a sync server; a first user device, for use by a first user, communicatively coupled to the sync server; a second user device, for use by a second user, communicatively coupled to the sync server; and a content source providing a content. The sync server may be configured to transmit the content as each of a first content to the first user device and as a second content to the second user device. The sync server may be configured to adjust a first bit rate for the first content. Upon adjusting the first bit rate, the first content and second content may be respectively provided to each of the first user device and the second user device such that the first user device and the second user device can substantially simultaneously and separately present the first content to the first user and the second content to the second user.

For at least one embodiment, a system for facilitating watch parties may include a sync server configured to adjust the first bit rate based upon a first latency and a first delay. The first latency may arise over a first content link between the sync server and the first user device. The first delay may be a first user device delay. The first user device delay may occur while the first user device decodes the first content for presentation to the first user.

For at least one embodiment, a system for facilitating watch parties may include a sync server configured to receive a first reply from a first user device. The first reply may include a first network time and a first device time. The first network time may indicate when a first ping sent by the sync server was received by the first user device. The first device time may indicate when the first user device completed decoding of a first data packet provided with the first ping. The sync server may be configured to execute non-transient computer instructions for determining the first latency based upon the first network time. The computer instructions may also include instructions for determining the first user device delay based upon the first device time.

For at least one embodiment, a system for facilitating watch parties may include a sync server configured to process a first data packet that includes an MPEG encoded video content segment.

For at least one embodiment, a system for facilitating watch parties may include a sync server configured to adjust a second bit rate for a second content based upon a second latency and a second delay. The second latency may arise over a second content link between the sync server and a second user device. The second delay may be a second user device delay. The second user device delay may occur while the second user device processes the second content for presentation to the second user.

For at least one embodiment, a system for facilitating watch parties may include a sync server configured to receive a second reply from a second user device. The second reply may include a second network time and a second device time. The second network time may indicate when a second ping sent by the sync server was received by the second user device. The second device time may indicate when the second user device completed decoding of a second data packet provided with the second ping. The sync server may be configured to execute non-transient computer instructions for determining the second latency based upon the second network time. The computer instructions may also include instructions for determining the second user device delay based upon the second device time.

For at least one embodiment, a system for facilitating watch parties may include a sync server configured for use with a first data packet and a second data packet that include an identical MPEG encoded video content segment.

For at least one embodiment, a system for facilitating watch parties may include a sync server configured to execute non-transient computer instructions for determining a first latency at multiple first bit rates. The computer instructions may also include instructions for determining a second latency at multiple second bit rates.

For at least one embodiment, a system for facilitating watch parties may include a sync server configured to execute non-transient computer instructions for determining a first user device delay at multiple first bit rates. The computer instructions may also include instructions for determining the second user device delay multiple second bit rates.

For at least one embodiment, a system for facilitating watch parties may include a sync server configured to execute non-transient computer instructions for determining a first minimum quality level for presentation of the first content, at each of the multiple first bit rates, based upon the first latency and the first device delay. The computer instructions may also include instructions for determining a second minimum quality level for presentation of the second content, at each of the multiple second bit rates, based upon the second latency and the second device delay.

For at least one embodiment, a system for facilitating watch parties may include a content source that is a first user device.

In accordance with at least one embodiment of the present disclosure, a method for facilitating watch parties may include forming a watch party including a first user device and a second user device. The method may include determining a first latency for first content link between the first user device and a sync server. The method may include determining a second latency for a second content link between the second user device and the sync server. The method may include adaptively changing at least one of a first bit rate for the first content link and a second bit rate for the second content link. For at least one embodiment, at least one of the first bit rate and the second bit rate may be adaptively changed such that a first presentation of a first content by the first user device occurs substantially simultaneously with a second presentation of a second content by the second user device.

For at least one embodiment, a method for facilitating watch parties may include first content and second content that are substantially identical.

For at least one embodiment, a method for facilitating watch parties may include detecting, by the first user device, a first reaction. The method may include communicating, by the first user device, the first reaction to the second user device. The method may include presenting, by the second user device, the first reaction substantially simultaneously with the detecting of the first reaction by the first user device.

For at least one embodiment, a method for facilitating watch parties may include synchronizing, by a first user device, a first reaction with a first segment of a first content. The method may include synchronizing, by a second user device, the first reaction with a second segment of the second content. The first segment may be presented by the first user device substantially simultaneously with the presenting, by the second user device, of the second segment and the first reaction.

For at least one embodiment, a method for facilitating watch parties may include communicating a first reaction by a first user device to a sync server over a first chat link. The first reaction may be communicated by the sync server to a second user device over a second chat link. Each of the first chat link and the second chat link may utilize 5G communications technology.

In accordance with at least one embodiment of the present disclosure, a method for facilitating watch parties may include establishing a first sync link between a first user device and a sync server, establishing a second sync link between a second user device and the sync server, and selecting a content for presentation by each of the first user device and the second user device. For at least one embodiment, a first copy of the content may be directly accessible by the first user device. A second copy of the content may be directly accessible by the second user device. The method may further include operations of establishing a first chat link between the first user device and the sync server, establishing a second chat link established between the second user device and the sync server, and detecting a first reaction by the first user device. The first reaction may be communicated to the second user device via each of the first chat link and the second chat link. The method may also include synchronizing, by the sync server, presentation of the first copy by the first user device with a presentation of the second copy and the first reaction by the second user device.

For at least one embodiment, a method for facilitating watch parties may include determining a first user device delay for the first user device, determining a second user device delay for the second user device, determining a first latency for the first chat link, and determining a second latency for the second chat link. The synchronizing of the presentation of the first copy by the first user device with the presentation of the second copy and the first reaction by the second user device may be based upon at least one of the first user device delay, the second user device delay, the first latency and the second latency.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

FIGS. 3A to 3C are a flow diagram illustrating a process for facilitating watch parties and in accordance with at least one embodiment of the present disclosure.

DETAILED DESCRIPTION

Figure 1:
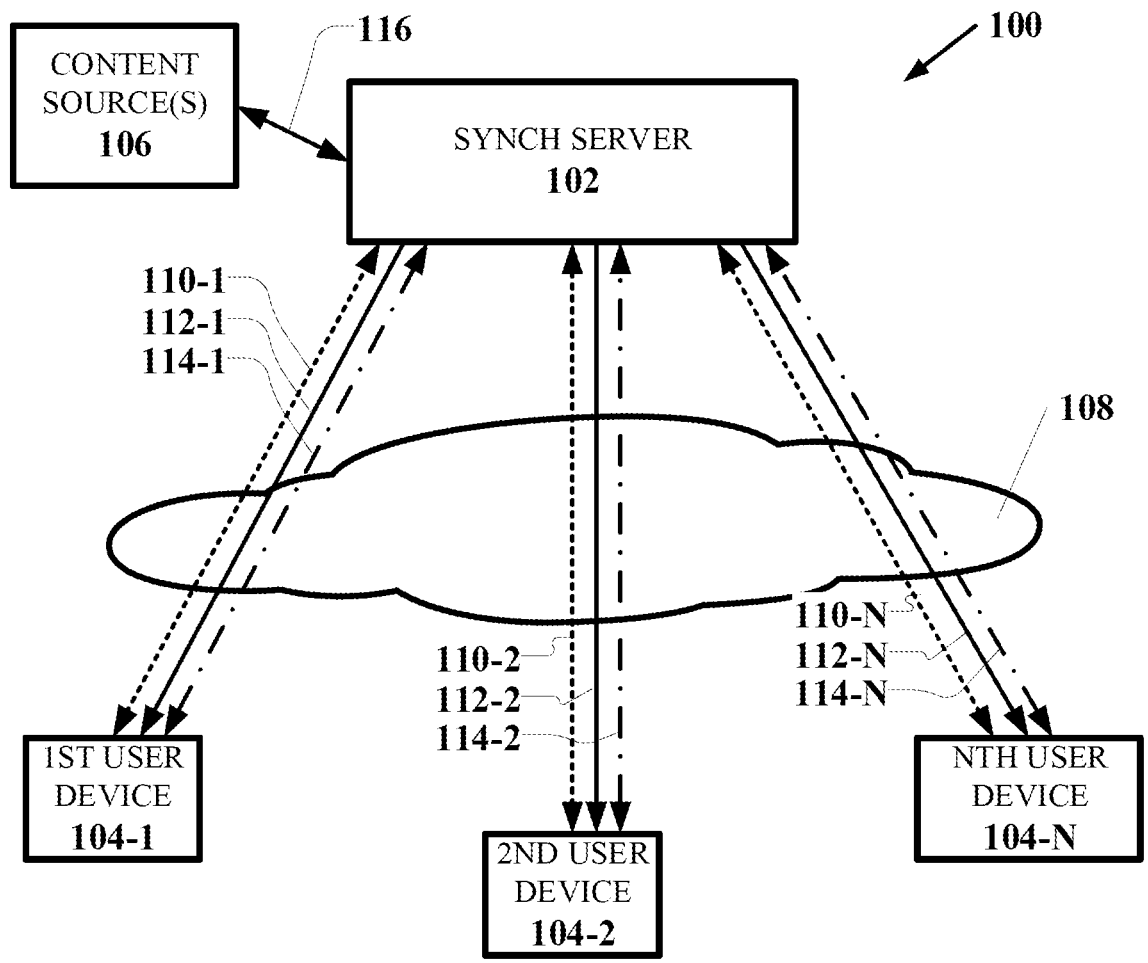
FIG. 1 is a schematic illustration of a system for facilitating watch parties and in accordance with at least one embodiment of the present disclosure.

The various embodiments of the present disclosure describe devices, systems, and processes for facilitating watch parties. In accordance with at least one embodiment of the present disclosure, and as defined herein, a "watch party" is a "substantially simultaneous" (as defined below) and "separate" (as defined below) presentation of "content" (as defined below), and one or more user "reactions" (as defined below) thereto, to each of two or more users.

As used herein, "substantially simultaneous" means without incurring a humanly perceptible delay between a presentation of one or more, if not both, of the content and a reaction to such content by a given user, to two or more other users. For example and for at least one embodiment, a cheering by a first user in response to a goal scored in a football game (a "reaction") is separately presented to a second user at substantially the same time that the first user reacts to their viewing of the scoring of the goal. In essence, the second user is presented with the first user's reaction as if they both were physically present in a same room and viewing the football game together.

As used herein, "content" refers to any humanly perceptible information, such as video, television programs, audio programs, speeches, concerts, gaming, or otherwise. The content may originate from any source, including live, augmented reality, virtual reality, computer generated, or otherwise. The content may be presented to a given user using any desired user device (as described below). The content may be presented to one or more users "real-time" (which is defined herein to mean as the underlying action provided in such content first occurs in time), on a recorded, time delayed, time shifted, or any other basis.

As used herein, "separate" when referring to two or more users participating in a watch party, means a first user may be physically or virtually separated from one or more second users such that each user is uniquely presented the content, in whole or in part, in a format perceptible by such user. For at least one embodiment, such separation may occur geographically, wherein a first user is in a different room, building, city, state, or country than one or more second users. For at least one embodiment, a separation may occur virtually, such as when a first user perceives the content and/or reaction(s) as presented, in whole or in part, in a first format (such as an audible portion of the football game in a first language), while a second user perceives the content and/or reactions in a second format (such as the audible portion of the football game being provided in a second language). For at least one embodiment, such separation may occur both geographically and virtually.

As used herein, a reference to "Cloud" includes without limitation references to cloud computing, cloud storage, cloud communications, and/or other technology resources which do not require a viewer to actively manage the providing or use of such resources. A use of a Cloud resource may be private (limited to certain users and/or uses), public (available for many users and/or uses), hybrid, dedicated, non-dedicated, or otherwise. It is to be appreciated that any device or system of the various embodiments of the present disclosure may use Cloud resources to provide for processing, storage and other functions.

As shown in FIG. 1, system for facilitating watch parties may include a synchronization ("sync") server 102 that is communicatively coupled by a communications network 108 to each of two or more user devices 104-1 to 104-N and to at least one content source 106. Each of these system components are further described below.

Sync Server 102

Figure 2:
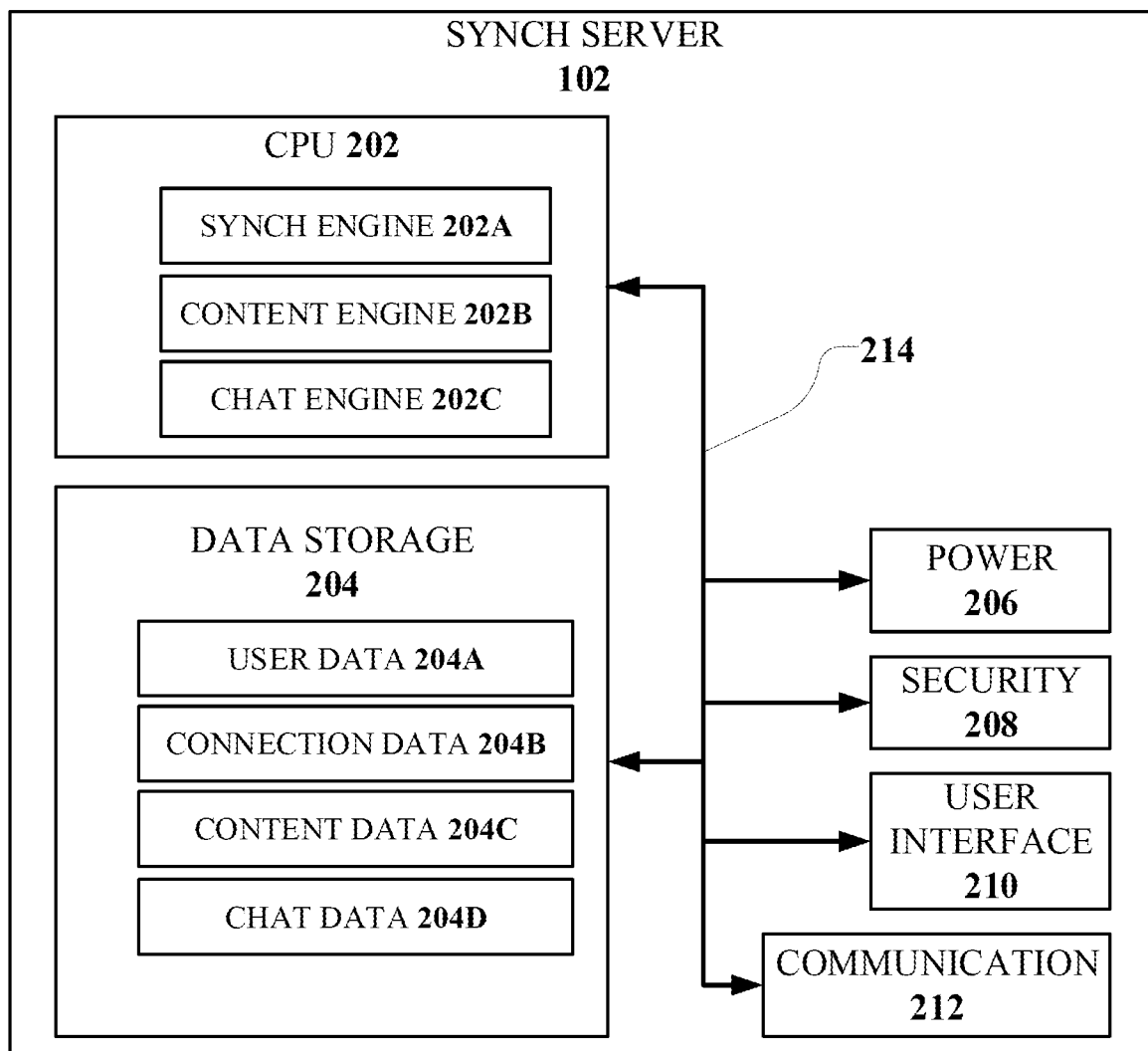
FIG. 2 is a schematic illustration of a synchronization server for use in facilitating watch parties and in accordance with at least one embodiment of the present disclosure.

As shown in FIG. 2, the sync server 102 may include and/or be communicatively coupled to a central processing unit (CPU) 202. The CPU 202 may be provided by any local processing device capable of executing one more non-transient computer executable instructions (herein, each a "computer instruction") which, in accordance with an embodiment of the present disclosure, facilitate one or more data processing operations including, but not limited to: sync engine 202A, a content engine 202B, and a chat engine 202C (such engines are further described below). It is to be appreciated that for at least one embodiment, one or more of the engines 202-A/B/C may be combined and/or provided separately.

The CPU 202 may include one or more physical (as compared to logical) components configured for such data processing operations. For at least one embodiment, the CPU 202 may include one or more hardware processors, such as 32-bit and 64-bit central processing units, multi-core ARM based processors, microprocessors, microcontrollers, and otherwise. The computer instructions may include instructions for executing one or more applications, software engines, and/or processes configured to perform computer executable operations. Such hardware and computer instructions may arise in any desired computing configuration including, but not limited to, local, remote, distributed, blade, virtual, or other configurations and/or systems configured for use in support of the one or more embodiments of the present disclosure.

The CPU 202 may be communicatively coupled by a data bus 214 or similar structure to a storage device 204, which may also be referred to as a "computer readable storage medium." As shown in FIG. 2, the storage device 204 may be a single storage device, multiple storage devices, or otherwise. The storage device 204 may be provided locally with the sync server 102 or remotely, such as a data storage service provided on the Cloud, and/or otherwise. Storage of data, including but not limited to user data 204A, connection data 204B, content data 204C, chat data 204D, and other data may be managed by a storage controller (not shown) or similar component. It is to be appreciated such storage controller manages the storing of data and may be instantiated in one or more of the storage device 204, the CPU 202, on the Cloud, or otherwise. Any known or later arising storage technologies may be utilized in conjunction with an embodiment of the present disclosure.

Available storage provided by the storage device 204 may be partitioned or otherwise designated by the storage controller as providing for permanent storage and temporary storage. Non-transient data, computer instructions, or other the like may be suitably stored in the storage device 204. As used herein, permanent storage is distinguished from temporary storage, with the latter providing a location for temporarily storing data, variables, or other instructions used for a then arising data processing operations. A non-limiting example of a temporary storage device is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store either, if not both, transient and non-transient computer instructions and other data.

The sync server 102 may be any computing device capable of facilitating one or more of the operations described below with respect to the flow diagram of FIGS. 3A to 3C and/or otherwise provided by an embodiment of the present disclosure.

The sync server 102 may be further configured, for at least one embodiment, to include a power module 206. The power module 206 may include any known or later arising technologies which facilitate the use of electrical energy by a content access device. Non-limiting examples of such technologies include batteries, power converters, inductive charging components, line-power components, solar power components, and otherwise.

The sync server 102 may be further configured, for at least one embodiment, to include a security module 208. The security module 208 may include any known or later arising security hardware components and/or computer instructions configured for use to secure content, communications regarding such content, access device processes and data, and otherwise. Security components may be used to facilitate secure transmission, processing, storage and otherwise of any data used in accordance with an embodiment of the present disclosure.

The sync server 102 may be further configured, for at least one embodiment, to include a user interface module 210. The user interface module 210 may include any known or later arising human to device interface components, processes and technologies. Non-limiting examples of input/output uses include audible inputs (such as spoken commands) and outputs (generated sound), visible inputs (such as eye tracking and facial recognition) and outputs (such as visible images presented on a display device, LEDs, or otherwise), touch inputs touch feedback (such as vibrations or other movements), gesture tracking, and otherwise. The user interface module 210 may be coupled to and/or include the one or more presentation devices (not shown). The presentation devices facilitate interactions between the user and the sync server 102.

The sync server 102 may be further configured, for at least one embodiment, to include one or more communications modules 212. The communications modules 212 may be configured to use any known or later arising communications and/or networking technologies which facilitate use of the communications network 108 (as further described below).

User Device(s) 104

Referring again to FIG. 1 and for at least one embodiment, the system 100 includes two or more user devices 104-1 to 104-N. The user devices 104 may be similarly configured to the sync server 102 to include one or more processors, data storage components, user interface components, security components, and communications components. The user devices 104 may also include one or more location components (not shown) that may be useful in determining a then present location for the user device 104. The characteristics and capabilities of such components are well known in the art and one or more of such components may be configured to execute computer instructions which facilitate watch parties as per one or more of the embodiments of the present disclosure. Non-limiting examples of user devices 104 include smartphones, laptop computers, tablet computing devices, desktop computers, smart televisions, smart glasses, virtual reality glasses, augmented reality glasses, earbuds/headphones and other audible output devices, and other devices. User devices 104 may be communicatively coupled to a cable system, satellite system, streaming audio and video system, online gaming system, and/or other content distribution systems, on-line content distribution systems, and the like to facilitate communications with the sync server 102.

Content Sources 106

For at least one embodiment, the system 100 may include one or more content sources 106. The content sources 106 may be similarly configured to the sync server 102 to include one or more processors, data storage components, user interface components, security components, communications, and location components. The characteristics and capabilities of such components are well known in the art and one or more of such components may be configured to execute computer instructions which facilitate watch parties in accordance with at least one embodiment. Non-limiting examples of content sources 106 include cable and satellite television system, such as those provided by COMCAST and DISH NETWORK, streaming content sources, such as those provided by SLING TV, YOUTUBE, and others, video-on demand sources, such as those provided by NETFLIX, HULU and others, and other sources of content. For at least one embodiment, a content source may be a user device 104, wherein the user device provides live or recorded content for use during a watch party. For at least one embodiment, a user device 104 may function as both a presentation device to a given user during a watch party as well as a content source for presentation of content to other users during the watch party. For example, a birthday party may be captured by a user's device, such as a smartphone, communicated to the sync server 102 and presented to other users, during a watch party, with reactions by one or more of such users being shared with each of the other users substantially simultaneously.

Network 108

For at least one embodiment, the system 100 includes a communications network 108 that communicatively couples each user device 104 with the sync server 102 and communicatively couples the content source 106 with the sync server 106. For at least one embodiment, user devices 104 may be directly or indirectly coupled to each other. The communications network 108 may utilize any known and/or later arising communications and/or networking technologies, standards, protocols or otherwise. Non-limiting examples of such technologies include packet switch and circuit switched communications technologies, such as and without limitation, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, Internet of Things (IoT) networks, Cloud based networks, private networks, public networks, or otherwise. For at least one embodiment, the communications network 108 may utilize mid-band and/or high band 5G communications frequencies. As is commonly known and appreciated, mid-band 5G communications frequencies typically support communications of 100-400 Mb/s download and are typically deployed over 2.4 GHz to 4.2 GHz frequencies. Likewise, high band 5G communications frequencies typically support communications of 1-2 Gb/s download and are typically deployed over 24-72 GHz frequencies. For at least one embodiment, one or more communications and networking standards and/or protocols may be used including, without limitation, the TCP/IP suite of protocols, the Extensible Message and Presence Protocol (XMPP), VOIP, Ethernet, Wi-Fi, CDMA, GSM/GRPS, TDMA/EDGE, EV/DO, WiMAX, SDR, LTE, MPEG, and others.

As shown in FIG. 1, one or more communications links may be established between a user device 104 and the sync server 102. It is to be appreciated that any combination of communications links, including each of the communications links, may be combined or provided as single, multiple or other combinations of communication links for at least one embodiment of the present disclosure. Accordingly, it is to be appreciated that the communications links are described herein for purposes of functional explanation only and are not limited to any particular physical configurations.

More specifically, each user device 104 may establish a sync link 110-1/2/N with the sync server 102. For at least one embodiment, the sync link 110 may be used to facilitate communication of timing, status and other synchronization information by and between a given user device 104 and a given sync server 102.

As further shown in FIG. 1, each user device 104 may establish a content link 112-1/2/N with the sync server 102. For at least one embodiment, the content link 112 may be used to facilitate communication of content by the sync server 102 to each user device 104. While depicted in FIG. 1 as a unidirectional link, it is to be appreciated that when a given user device 104 also functions as a content source, the content link 112 may be reversed between that given user device functions as both a content source and a content recipient.

As further shown in FIG. 1, one or more, including but not limited to each, user device 104 may establish a chat link 114-1/2/N with the sync server 102. For at least one embodiment, the chat link 114 may be used to facilitate bi-directional communication of one or more users' reactions to a given content during a watch party. For at least one embodiment, reactions captured by only a given user device may be shared during a watch party. For another embodiment, reactions captured by permitted user devices may be shared during a watch party. For another embodiment, reactions captured by any user device may be shared during a watch party. For at least one embodiment, a user's reactions during a watch party may be communicated to the sync server 102 using the chat link 114 and redistributed to the other users using the content link 112. For example, audio and/or video of a user's reaction may be communicated over respective content links 112 to other users in a picture-in-picture, overlay, separate audio channel, mixed audio channel, text message stream, closed captioning stream, or otherwise. It is to be appreciated that such "reactions" may be communicated using the system 100 in separate data streams, such as separate MPEG, AAC, or other audio and/or video streams. Each user device 104 and/or the sync server 102 may be configured to mix, present or otherwise process reactions in accordance with preferences of a given user, based upon a default setting, or otherwise. For at least one embodiment, one or more of the sync server, a transmitting user device and/or a receiving user device may be configured to transform reactions provided by a given user into an audible, visual, grammatical, phonetic, language, or other format preferred by another user. For example, audible reactions in the Spanish language may be translated into the English language. Similarly, audible reactions may be converted to text for hearing impaired users and physical reactions (such as clapping or the like) may be converted to descriptive text for visually impaired users. Other reactions may be converted as desired for any given embodiment. For at least one embodiment, Cloud based resources may be used for reaction conversions.

As further shown in FIG. 1, one or more source links 116 may be established between a content source 106 and the sync server 102 and/or one or more user devices 104. For at least one embodiment, the source links 116 facilitate the providing of content, for a watch party, to each user device 104 indirectly by routing such content thru and/or via the sync server 102 and/or one or more streaming servers (not shown) operating under direction and/or control of the sync server 102.

For at least one embodiment of the present disclosure, one or more direct connections between a content source 106 and each user device 104 may be used. As used herein, a "direct" connection between a content source 106 and a user device 104 does not utilize the sync server 102, or a streaming server operating under the direction and control of the sync server 102, to provide the content to a given user device 104. For at least one embodiment, a hybrid topology may be used where both in-direct and direct connections are used between content sources 106, sync server 104, and one or more user devices 104.

Referring again to FIG. 2, for at least one embodiment, the sync server 102 may be configured to manage and process content and reactions for facilitating watch parties by executing computer instructions for the sync engine 202A, content engine 202B and chat engine 202C. Such engines 202, may also be instantiated and executed, in whole or in part, on one or more, if not each, of the user devices 104.

More specifically and for at least one embodiment, the sync engine 202A facilitates synchronization of content amongst the various user devices based upon determined communications network delays (herein, "latency"), user device content and/or reaction processing delays (herein, "user device delays"), and other delays. As further described below in conjunction with the process of FIGS. 3A to 3C, the sync engine 202A may be configured to manage formation of watch parties, determine latency, user device delays, and other delays, and synchronize the providing of content for presentation on a given user device. For at least one embodiment, content synchronization may occur based upon one more identifiable portions of a content. For at least one embodiment, content portions may be identified by one or more of an elapsed time, a remaining time, a presentation time stamp, a decoder time stamp, an absolute time (such as a time based on a universal time), a packet number, or packet identifier, or otherwise.

For at least one embodiment, the content engine 202B may be configured to manage the providing of content to each user device 104 during a watch party. For at least one embodiment, the sync server 102 may be configured to operate as one or more streaming servers (with each streaming server providing content to one or more given user devices 104). The content engine 202B may be configured to request (when needed) and receive one or more content segments from a content source 106. The content engine 202B may further be configured to buffer, temporarily store, and/or permanently storage of such content segments for later providing of the same to one or more user devices.

For at least one embodiment, a content engine 202B, whether instantiated on a sync server 102 or a user device 104, may be configured to control one or more aspects of presentation of a given content. For example, and not by limitation, one or more trick-play modes may be supported by a content engine 202B, non-limiting examples of trick-play modes include: Pause, Play, Skip, Fast Forward, Reverse, Stop, and the like. For at least one embodiment, trick-play modes (when supported for a given content) may be selected by a "director" (as defined below) using an appropriate input/output device, such as a remote-control device, a verbal command, a gesture, or otherwise. For at least one embodiment, a contextual voice command, or the like, may be used to initiate a watch party—as further described below in conjunction with the process of FIGS. 3A to 3C.

For at least one embodiment, the content engine 202B may be configured such that a given content segment is communicated to each of the two or more user devices participating in a given watch party such that any latency, user device delays and/or other delays associated with such communication and processing of the content segment by each user device are accounted for and such that the presentation of the given content segment occurs substantially simultaneously across each user device then participating in the watch party. For at least one embodiment, the content engine 202B may be configured such that content communicated to each user device participating in a given watch party is provided at one or more of a preferred quality setting, a minimum quality setting, a maximum quality setting, or otherwise. For at least one embodiment, when a specified quality setting is not achievable, at a given time, the content engine 202B may be configured to take corrective actions until such minimum quality settings can be realized. Non-limiting examples of such corrective actions include: pausing presenting of the content to one or more, if not all, user devices participating in the watch party; providing an alternative content link to those user devices not otherwise receiving the content at the desired minimum quality level; recording the event for later presentation; disabling sharing of reactions, in one or more formats (such as audio and video), to and/or from one or more user devices; providing an option to a user of a given user device to accept a different quality level; forcing participating user devices (as defined below) to jump ahead to a content location for a director (as defined below); or taking other actions.

In accordance with at least one embodiment of the present disclosure, the content engine 202B may be configured to facilitate such substantially simultaneous presentation of a given content segment by adaptively modifying one or more of the resolution, bit rate, content size, communications bandwidth utilized, communications link type used between the content server 102 and a given user device 104, or otherwise.

For at least one embodiment, the content engine 202B may be configured to retrieve and synchronize presentation of content stored on each user device in order to facilitate a watch party. For such an embodiment, the content engines 202B on each of the sync server 102 and the user devices 104 may be configured to communicate status information over the sync links 110 and may not need to utilize content links 112. For at least one embodiment, a director may be configured to control any trick-mode operations, with users of participating user devices requesting trick-mode operations (such as PAUSE) via a chat link 114.

For at least one embodiment, two or more user devices may be configured to have trick-mode control capabilities. For such an embodiment, a selection of a trick-mode operation may result in a communication to the director 104-1 and/or sync server 102 to initiate the selected trick-mode operation.

For at least one embodiment, adaptive bitrate streaming sessions may be used between the sync server 102 and each user device 104 to facilitate substantially simultaneous presentation of content during a watch party. One or more adaptive bitrate streaming technologies may be utilized by the content engine 202B executing on the sync server 102 and on a player client/content engine executing on a given user device. Non-limiting examples of adaptive bitrate streaming technologies that may be utilized include MPEG-DASH, Adobe Systems HTTP Dynamic Streaming, Apple HTTP Live Streaming, Microsoft Smooth Streaming, and others. It is to be appreciated that by adaptively modifying the bitrate used to provide content to each user device, given content segments may be provided, decoded and presented on each user device substantially simultaneously during a watch party. For example, for a first user device 104-1 communicatively coupled to the sync server 102 using a 100 Mb/s connection, the sync server 102 provide a given content segment at a 4K resolution over a first content link 112-1. Further and for a second user device 104-2 communicatively coupled to the sync server 102 then using only a 15 Mb/s connection, the sync server 102 may provide the given content segment at a 720p resolution over a second content link 112-2. By providing the given content segment at the lower resolution it is to be appreciated that the reception and presentation of such content may occur substantially simultaneously (assuming user device content processing times are equal).

Further, given that processing times for user devices for given content segments may vary, the sync server 102 may use the content engine 202B, in conjunction with the sync engine 202A, to determine user device delays. Such user device delays may be determined one-time, for example upon an initialization of a first watch party, every time a watch party is formed, or otherwise. Such user device delays may be determined based upon test content segments, initial content segments, or otherwise. Such user device delays may be suitably stored by the sync server 102 in data storage 204 as one or more user data 204A. User data 204A may further include information regarding each user device 104, preferences for a user associated with such user device, and other user device specific information.

Further, various connection data 204B may be stored in the storage device 204 and used by the sync server 102 in facilitating a watch party. Non-limiting examples of such connection data include type of connection, distance of user device from sync server, maximum available bandwidth of the connection, throughput for the connection, latency, and other data. Connection data may be determined for each content link 112 on a once, repeated, or other basis. It is to be appreciated that a content link 112 may change as the location of a given user device 104 changes. For example, a user device 104 may participate in a first watch party from a home location using a high-speed Internet connection, while participating in a second watch party using a 4G cellular connection. Accordingly, it is to be appreciated that connection data determined and stored and the frequency of such determining and storing may vary based upon a type of connection then being used by a given user device while participating in a watch party. Such connection data may be used by the sync server 104 in initially configuring the content link between the sync server 102 and a given user device 104 and in reconfiguring, such as by adjusting a bitrate utilized, the content link used during the watch party to facilitate substantially simultaneous presentation of content to multiple users during a watch party.

The sync server 102 may be further configured to include content data 204C. For at least one embodiment, content data 204C may include segments of content for a given program. For at least one embodiment, all segments of a given content may be stored on the sync server 102, one or more user devices 104 and/or the Cloud.

For at least one embodiment, content may be made available by a producer, publisher, distributor, or other source of such content. For example, a producer for a new television series may initiate a watch party available to select, all, or other combinations of user devices. That is, watch parties may be used for promotional purposes. Watch parties may also be used for any other desired, lawful purpose; non-limiting examples including gambling, sporting contests, shopping, educational and training, cooking, or otherwise. For at least one embodiment, watch parties may be used for sporting contests, such as MARCH MADNESS, the OLYMPICS, the WORLD CUP, FORMULA 1 races, or otherwise to facilitate common viewing of real-time content of particular interest to one or more users. For example, last minute action in a basketball game may be presented to multiple users during a watch party by a sync server 102 adaptively selecting a content source (such as an online, cable, satellite or other a/v stream) providing the action.

For at least one embodiment, a sync server 102 may include information identifying segments of content that are stored on one more user devices 104. Such content segments are referred to herein as "pre-cached content." Non-limiting examples of pre-cached content may include commercials, segments of non-live programs, or otherwise. Pre-cached content may be used by a sync server 102 to facilitate a watch party by providing ready access to content, by a given user device, when a given content link 112 is unreliable, of insufficient bandwidth, experiences undesirable latency, or otherwise. For at least one embodiment, a sync server 102 may instruct a given user device 104 to access such pre-cached content on an on-demand or otherwise basis. Such instructions may be provided, for at least one embodiment, over one or more of the sync link 110 and/or the content link 112.

The sync server 102 (and/or one or more user devices 104) may be further configured to execute a chat engine 202C. The chat engine 202 may be configured to facilitate communications between user devices 104 during a watch party. For at least one embodiment, such communications may occur using a chat link 114. Such communications may take any desired form, such as audio, text message, emoticons, video, audio, GIFs, video, graphics, or otherwise. The chat engine 112 may facilitate user-to-user (or private) communications, user-to-multiple user (or semi-private) communications, user-to-all (or public) communications, or otherwise.

For at least one embodiment, user communications may be stored in data storage 204 as chat data 204D. Such chat data may be time stamped and/or otherwise synchronized with respect to a given content segment such that a later playback of the chat data and/or the given content segment may include chat data corresponding to such given content segment, as such chat data was generated during the given watch party. For example, a later viewing of the football program and watch party by an Nth user may include a presentation of the chat data arising between a first user and a second user during the original watch party. Such later synchronization and presentation of chat data may enable the Nth user to enjoy the original watch party as if participating real-time even though such watch party may in fact have occurred earlier.

For at least one embodiment, a chat link 114 may be provided as a sub-stream of a content link 112 and/or of a sync link 110. The chat data communicated over the chat link 114 may be adaptively bit-rate provided to the various users in a watch party such that each user receives a given user's reaction at substantially the same time. For example, a video camera focused upon a first user (or group thereof) may adaptively bit-rate stream images (and audio) of such first user to other second users such that the reactions of the first user, as presented to the second users are in substantially simultaneous synch with the presentation of the given content segment being presented to the first user and resulting in the given reaction. Accordingly, and for at least one embodiment, a chat link 114 may be configured to utilize higher speed communications links than are used to facilitate the content links 112 such that reactions to content segments may be in substantially simultaneous synchronization with the content segment during a watch party. For at least one embodiment, chat links 114 are provided using networks supporting high band 5G communications.

Figure 3A:
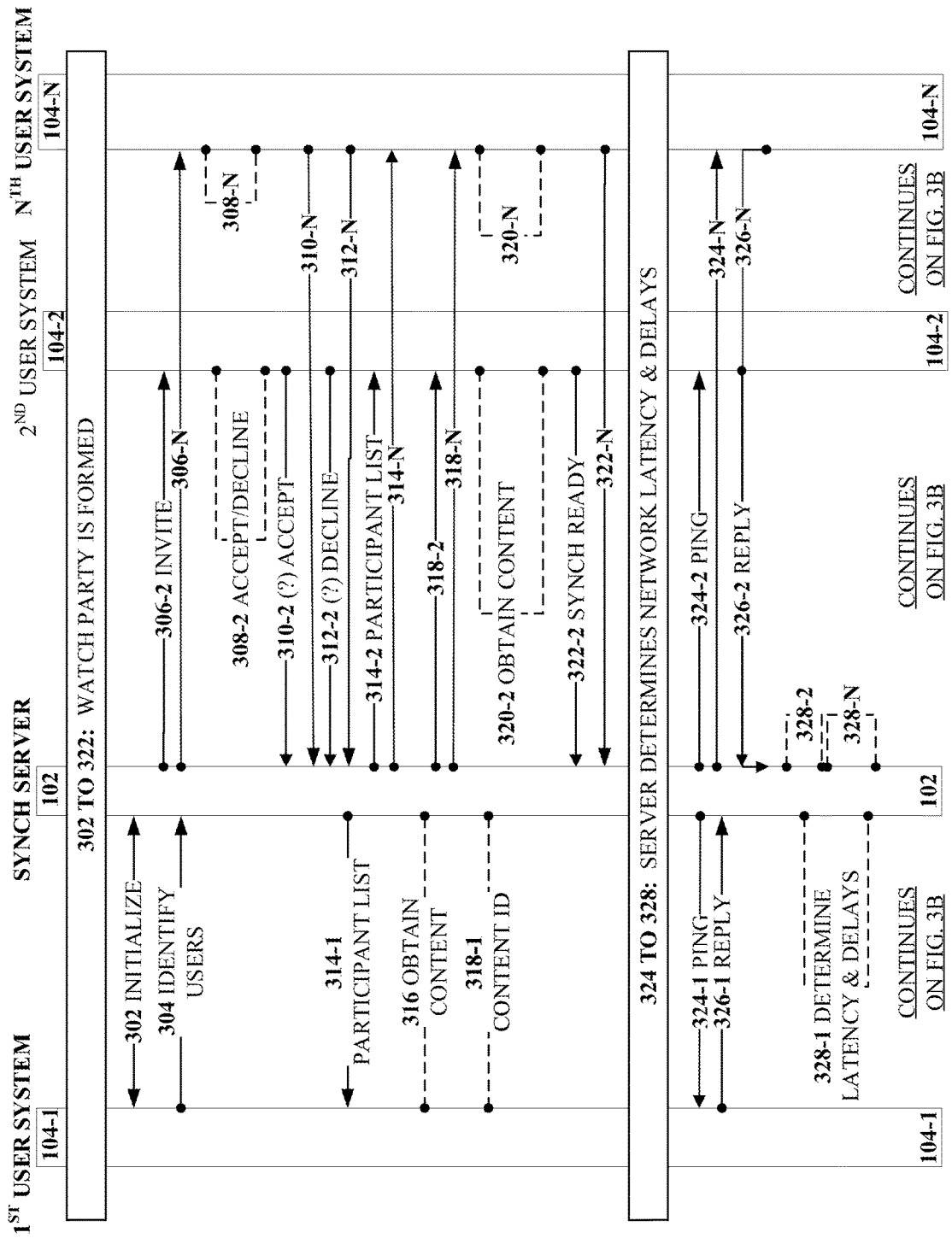
Figure 3C:
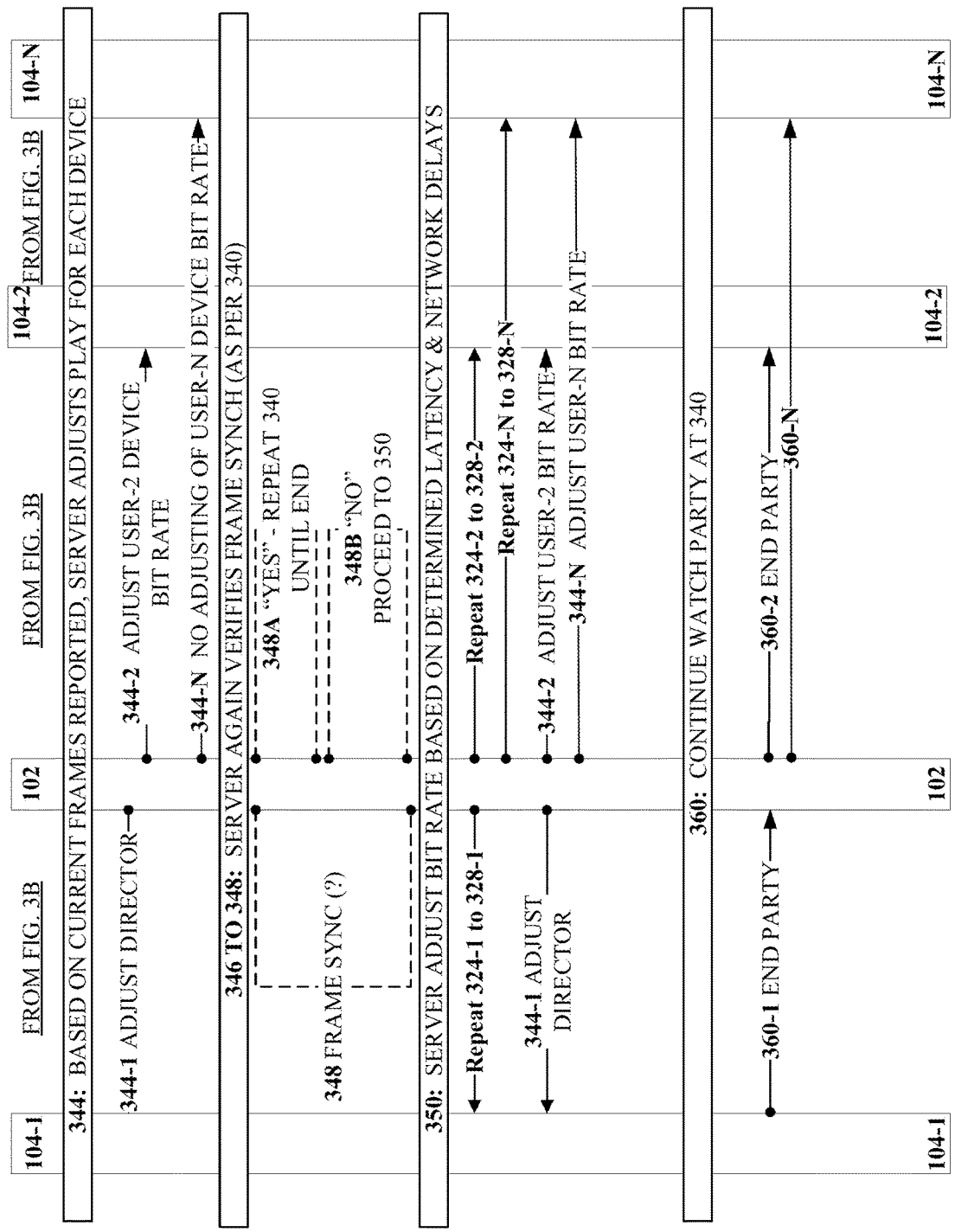

As shown in FIGS. 3A to 3C, one or more operations may be used in accordance with an embodiment of the present disclosure to facilitate substantially simultaneous presentation of content and/or chat data during watch parties. Such operations are identified by number as first, second, third, or other operations. Such numbering is for purpose of identification only and is not used herein to infer or impute that a given operation need occur before, after, in conjunction with, separately, or otherwise of any other operation.

More specifically and for at least one embodiment, a process for facilitating substantially simultaneous presentation of content and/or chat data during watch parties may generally include one or more operations for: forming the watch party; determining latency, bandwidth, and other delays between a sync server 102 and two or more user devices 104; obtaining content for the watch party for each user device; initiating presentation ("playing") of content on each user device; verifying synchronization of content across user devices during the watch party; adjusting playing of content for each user device; periodically verifying synchronization of content across user devices during the watch party; and adjusting bit rates for content to each user device based on determined latency and delays until an end for the watch party occurs.

More specifically and with respect to at least one embodiment of the present disclosure, a process for facilitating substantially simultaneous presentation of content and/or chat data during a watch party may include operations for forming a watch party. For at least one embodiment, such operations are depicted as arising per Operations 302 and 322.

As per Operation 302, the process may include initializing a first user device 104-1 as a "director" for a given watch party. For discussion purposes only herein, the "first user device" and the "director" are used interchangeably. It is to be appreciated that any given user device may be a director. For at least one embodiment, only a single director is designated for a given watch party. For another embodiment, two or more user devices may be designated as each being a director.

For at least one embodiment, a director 104-1 may specify to the sync server 102 the content to be presented during a watch party, when the watch party is to occur, when the watch party ends, who may chat or not chat, minimum quality levels, and any other conditions and/or terms of the watch party. Initialization may include one or more communications between the director 104-1 and the sync server 102. For at least one embodiment, such communications may arise using a first sync link 110-1.

Per Operation 304, the process may include the director 104-1 identifying one or more second users to invite to the watch party. Such one more identified users may include all users, such as for a public watch party, or a selection of users. Such selected users may include users then known or unknown to the director 104-1, source of the content, a provider of the sync server, or otherwise. For at least one embodiment, user data 204A maintained by one or more of the director 104-1 and the sync server 102 may identify the users to be invited to the watch party. For at least one embodiment, such communications may arise using the first sync link 110-1.

Per Operation 306-2/N, the process may include the sync server 102 communicating an invite 306-2/306-N to each identified user device. For at least one embodiment, each invite may be communicated using one or more sync links 110-2/N between the sync server 102 and each invited user device 104-2/N. For at least one embodiment, a common sync link 110 may be utilized. For at least one embodiment, a unique sync link 110-2/N may be used between the sync server 102 and each invited user device 104-2/N.

Per Operation 308-2/N, the process may include each invited user device 104-2/N accepting or declining the invitation. It is to be appreciated that an acceptance or declining of the invitation may occur for any reason. For at least one embodiment, an invited user device is deemed to decline an invitation unless an acceptance is communicated to the sync server 102 within a given period.

Per Operation 310-2/N, the process may include those accepting invited devices communicating such acceptance back to the sync server 102. For at least one embodiment, each acceptance may specify one or more communications parameters to be utilized for a content link 112-2/N between the sync server 102 and the accepting user device 104-2/N. Such communications parameters may include, without limitation, a network to utilize (such as, a LAN, WIFI, cellular, 5G or other network), maximum bandwidth allowed, minimum bandwidth, security protocols, or otherwise. Herein, for purposes of discussion only, each accepting user devices may be referred to as a "participating user device."

Per Operation 312-2/N, the process may include those declining invited devices communicating a "decline" message back to the sync server 102. For at least one embodiment, a decline message may request the sync server 102 to record the watch party for future presentation using the declining user device.

Per Operation 314-1/2/N, the process may include the sync server 102 communicating a list a participating user devices (a "participant list") to the director 104-1. For at least one embodiment, the participant list may be communicated to each of the participating user devices. The participant list may be communicated on an as accepted basis, once after a given time period for acceptance has elapsed, or otherwise. The participant list may include one or more identifications of the user devices that will be participating in the watch party, capabilities of participating user devices, communications parameters to use, minimum bandwidths of user devices, users associated with a given participating user device, and other information. Participant list information may be used by the synch engine 102 in facilitating the watch party, such as by ensuring minimum bandwidth requirements are satisfied, or other action is taken when not satisfied.

Per Operation 316, the process may include one or more of the sync server 102 and/or the director 104-1 obtaining the content to be presented during the watch party. It is to be appreciated that the obtaining of the content may include obtaining any rights and/or other permissions needed to facilitate the watch party. For example, for a multi-user presentation right, a sync server 102 may need to obtain permission from a source of the content to present such content to one or more, if not each, of the director 104-1 and the participating user devices 104-2/N before such content may be made available for presentation to such user devices.

Per Operation 318-1/2/N, the process may include the sync server 102 communicating a content ID to each of the director 104-1 and the participating user devices 104-2/N. The content ID may include any parameters needed to present the content by a given participating user device 104-2/N. Non-limiting examples of such parameters may include content identifiers, security keys, encoding formats used, and otherwise.

Per Operation 320-2/N, the process may include participating user devices 104-2/N obtaining access to the content. For at least one embodiment, the process may include contacting one or more streaming servers providing the content. For at least one embodiment, the process may include participating user devices 104-2/N obtaining access to pre-cached content. For at least one embodiment, the participating user devices 104-2/N may obtain the content from a storage device accessible by such participating user device 104-2/N.

Per Operation 322-2/322-N, the process may include participating user devices 104-2/N communicating a "synch ready" or similar signal to the sync server 102. For at least one embodiment, the synch ready signal may be communicated upon a participating user device 104-2/N obtaining access to the content.

Per Operation 324-1/2/N, the process may include the sync server 102 communicating a ping, query or other message to the director 104-1 and to each participating device 104-2/N (hereafter, such communication being referred to as a "ping"). For at least one embodiment, the ping may be sent to determine latency, user device delays and any other delays arising over a content link 112-1/2/N between each of a director 104-1, a participating user device 104-2/N, and the sync server 102. The ping may include multiple messages, with each message being sent to further define characteristics of a then arising content link between a given user device 104 and the sync server 102 (or other source of the content, such as a streaming server operating under the direction and/or control of the sync server 102).

Per Operation 326-1/2/N, upon receiving a ping, the process may include the director 104-1 and each participating user device 104-2/N communicating a reply to the sync server 102. For at least one embodiment, the reply may occur after data communicated in a given ping has been processed by the user device 104. For example, a ping may include an encoded audio/video packet, such as an MPEG packet. The reply may indicate when the ping was received, when the data provided therein was decoded, and when the audio/video data is suitable for output to a presentation device coupled to and/or provided with the given user device.

Per Operation 328-1/2/328N, from the data communicated in each reply, the process may include the sync server 102 determining one or more communications parameters. Examples of such communications parameters include, but are not limited to, latency for a given content link 112-1/2/N, user device delays, and any other delays. It is to be appreciated that determinations of such communications parameters may be repeated (by the sending of multiple pings) and provided for content data encoded at different bit rates, at variable bit-rates, using various and/or different network connections, and otherwise. A content link matrix may be established based on computed, observed, extrapolated, estimated, or otherwise determined communications parameters for each content link 112-1/2/N and for each user device 104. Such content link matrix may be used by the sync server 102 in selecting one or more of an adaptive bit-rate, network topology, timing of content transmission, sending content for pre-caching, or otherwise used during a given watch party.

As shown in FIG. 3B and per Operation 330-1/2/N, the process may include one or more of the director 104-1 and the sync server 102 selecting a first frame for the selected content. It is to be appreciated that a watch party may involve a presentation of content from a beginning or at any location within the content.

Per Operation 332-1/2/N, the process may include pausing the content at the first frame on one or more of the user devices 104. It is to be appreciated that an initial pausing may be desired in order to facilitate synchronization and substantially simultaneous presentation of the content across the two or more user devices 104 during the watch party. It is further to be appreciated that a length of first pausing of the content on a given user device, such as the first user device 104-1, may vary from a second pausing of the content on a second user device 104. A user device 104 may be instructed to execute a pause early to facilitate the transmission, receiving, decoding and presenting of second content substantially simultaneously with the presenting of such second content on another user device. Such a situation may arise where a given content link 112-1/2/N has greater latency, a given user device 104-1/2/N has a longer content processing time, or due to other conditions then arising, always arising, or anticipated to be later arising. Further, it is to be appreciated that a duration of a given pause may or may not be perceptible to a human user.

Per Operation 334-1/2/N, the process may include each user device 104 communicating to the sync server 102 when they have respectively entered pause mode and are ready to begin presenting the content.

Per Operation 336-1/2/N, the process may include the sync server 102 instructing each user device 104 to begin presenting the content. The sending of such instructions may be delayed with respect of one user device 104 relative to another user device 104. It is to be appreciated that the presenting of the content may proceed based on the unique streaming sessions established over the respective content links 112-1/2/N between the user devices 104 and the sync server 102.

Per Operation 338-1/2/N, the process may include presentation of the content at a desired bit rate, adaptive or otherwise, based upon one or more of a latency, user device delays, and/or other delays, as calculated per Operations 324 to 328.

Per Operation 340-1/2/N, the process may include each user device 104 communicating a current frame identifier to the sync server 102. Such communications may occur periodically, upon request, upon network status change, or otherwise.

Per Operation 342, the process may include the sync server 102 determining whether frame synchronization is occurring between the director 104-1 and the one or more participating user devices 104-2/N such that substantially simultaneous presentation of the content is occurring. For at least one embodiment, frame synchronization may be determined uniquely for each pairing of the director 104-1 and each participating user device 104-2/N. Under such a scenario, adaptations to bit rates may be made to either the first content link 112-1 and/or to each of the second to nth content links 112-2/N. It is to be appreciated that adjustments to the bit rate for the first content link 112-1 may be desired when frame synchronization issues are arising between the director 104-1 and multiple participating user devices 104-2/N. Contrarily, when frame synchronization issues are arising solely between the director 104-1 and one or a limited number of participating user devices 104-2/N, bit rate adjustments for those second content links 112-2 may be used.

For at least one embodiment, frame synchronization may be determined based upon when a current frame identifier is received by the sync server 102 from each of the user devices 104. Such determination may be made in view of the latency, user device delays, and/or other delays calculated per Operations 324 to 328. It is to be appreciated that Operation 342 may occur on any desired basis. For at least one embodiment, Operation 342 occurs for every "I" frame of an MPEG transmission stream. For at least one embodiment, Operation 342 occurs once every 0.2 seconds (every two-tenths of a second). For at least one embodiment, Operation 342 occurs once every 30 seconds. For at least one embodiment, Operation 342 occurs whenever a parameter for a given content link 112 exceeds one or more predetermined thresholds. For at least one embodiment, a predetermined threshold may be fixed or adjustable.

Per Operation 342A, when frame synchronization is present, the process of verifying frame synchronization continues until a correction is needed or an "end" of the watch party is requested. It is to be appreciated that a watch party may "end" for all participating user devices when requested by the director 104-1, when a director exits the watch party, when no more content is available, or otherwise. Similarly, a watch party may end for a given participating user device 104-2/N when one or more of a director 104-1 or the sync server 102 terminates participation in the watch party for a given user participating device 104-2/N. Further, a watch party may end with respect to a given user participating device 104-2/N when such user participating device 104-2/N is turned off, the watch party participation is terminated by the given user participating device 104-2/N, or otherwise. When a watch party ends with respect to a given user participating device 104-2/N, frame synchronization may no longer be performed with respect to such given user participating device 104-2/N but may continue with respect to one or more other user participating devices still participating in a given watch party.

Per Operation 342B, the process may include proceeding with Operation 344 when frame synchronization is not present. It is to be appreciated that per Operation 324B a determination of no frame synchronization being present may arise with respect to one, multiple, or all participating user devices 104-2/N and/or with respect to the director 104-1.

Per Operation 344, the process may include proceeding to adjust bit rate for one or more user devices 104. For at least one embodiment, when multiple and/or all participating user devices 104-2/N are not in frame synchronization with the director 104-1, the process may include adjusting the bit rate for the director 104-1. For at least one embodiment, when one or a few participating user devices 104-2/N are not in frame synchronization with the director 104-1, the process may include adjusting the bit rate for those participating user devices 104-2 not in frame synch with the director 104-1, while not adjusting the bit rate for other participating user devices, such as user devices 104-N, which are in frame synch with the director 104-1.

Per Operation 346, the process may include the sync server 102 again verifying frame synchronization between the director 104-1 and one or more, if not each, of the participating user devices 104-2/N. Such verification may occur by repeating Operation 340.

Per Operation 348, the process may include a second frame synchronization check. It is to be appreciated that the second frame synchronization check may be desired when the sync server 102 is continually having to repeat Operations 340 to 346 due to frame synchronization issues arising with respect to one or more participating user devices 104-2/N and the director 104-1. For at least one embodiment, Operation 348 may be triggered when frame synchronization issues arise over four (4) out of any given ten (10) "I" frames for an MPEG transport stream of the given content. For at least one embodiment, Operation 348 occurs whenever frame synchronization issues for a given content link 112 arise and exceed one or more predetermined second thresholds. For at least one embodiment, a predetermined second threshold may be fixed or adjustable.

When such a second frame synchronization condition is detected, the process proceeds to Operation 350.

Per Operation 350, the process may include establishing a new content link between one or more of the director

104-1, a participating user device 104-2/N, and the sync server 102. In establishing such new content link(s), Operations 324 to 328 may be performed to determine any latency, user device delays and other delays for a given content link 112. Further, Operations 344-348 may also be performed to adjust bit rates for one or more of the new content links.

Per Operation 360, the process may end with respect to one, multiple or all user devices, as discussed above.

While not shown in FIGS. 3A to 3C, it is to be appreciated that a similar synchronization process may be used to facilitate substantially simultaneous presentation of chat data during a watch party. For at least one embodiment, the process may proceed separately for each of content data and chat data, with such data streams each being synchronized and arising independently of each other. For another embodiment, chat data may be synchronized with content data. For example, a reaction detected by a first user device 104-1 and communicated over a first chat link 114-1 to the sync server 102 may be identified by a frame identifier corresponding to an immediately previously presented "I" frame for an MPEG transport stream (herein, the "reaction frame"). The sync server 102 may be configured to further provide such reaction to the other participating user devices 104-2/N, over respective second to nth chat links 114-2/N for presentation with a later arising "I" frame, such a next I frame arising in the content stream within one (1) second of the reaction frame. As discussed above, for at least one embodiment the chat links 114-1/2/N may utilize 5G communications networks to facilitate such substantially simultaneous presentation of chat data along with substantially simultaneous presentations of content data during a watch party.

Further, it is to be appreciated that when 5G and communications networks of similar characteristic are utilized, frame synchronization of content data may occur based upon any portion of an MPEG transport stream, such as decoding time for any "I", "P", or "B" MPEG frames.

It is to be appreciated that the operations described above and depicted in FIGS. 3A-3C are illustrative only and are not intended herein to occur, for all embodiments of the present disclosure, in the order shown, in sequence, or otherwise. One or more operations may be performed in parallel and operations may be not performed, as provided for any given use of an embodiment of the present disclosure.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

What is claimed is:

1. A system comprising:
a sync server;
a first user device, for use by a first user, communicatively coupled by at least one first coupling to the sync server;
a second user device, for use by a second user, communicatively coupled to the sync server;
wherein the second user device is remotely located from the first user device; and
a content source providing a content to the sync server;
wherein the sync server transmits the content as a first content to the first user device and as a second content to the second user device;
wherein the first user device transmits a first user device current frame identifier to the sync server;
wherein the first user device transmits a first network time and a first device time to the sync server;
wherein the first device time indicates when the first user device decoded of a first data packet provided with a first ping sent by the sync server to the first user device using the at least one first coupling;
wherein the second user device transmits a second user device current frame identifier to the sync server;
wherein the sync server compares the first user device current frame identifier to the second user device current frame identifier;
wherein the sync server adjusts a first bit rate, resulting in an adjusted first bit rate, utilized for transmission of the first content from the sync server to the first user device based on a result of the comparing of the first user device current frame identifier to the second user device current frame identifier;
wherein the sync server utilizes a content link matrix to adjust the first bit rate; and
wherein the content link matrix identifies at least one communication parameter for the at least one first coupling determined based on a content data encoded at two or more bit rates and using two or more network connections;
wherein the sync server transmits the first content to the first user device at the adjusted first bit rate; and
wherein upon adjusting the first bit rate, the first user device and the second user device receive, from the sync server, and substantially simultaneously and separately present the first content to the first user and the second content to the second user.

2. The system of claim 1,
wherein the sync server adjusts the first bit rate based upon a first latency determined from the first network time and a first user device delay determined from the first user device time received by the sync server from the first user device.

3. The system of claim 2,
wherein the first latency arises over a first content link between the sync server and the first user device.

4. The system of claim 3,
wherein the first user device delay occurs while the first user device decodes the first content for presentation to the first user.

5. The system of claim 2,
wherein a first reply received by the sync server from the first user device includes:
 a first network time and the first device time;
  wherein the first network time indicates when the first ping was received by the first user device;
and
wherein the sync server executes non-transient computer instructions for:
 determining the first latency based upon the first network time; and
 determining the first user device delay based upon the first device time.

6. The system of claim 5,
wherein the first data packet includes an MPEG encoded video content segment.

7. The system of claim 6,
wherein the sync server adjusts a second bit rate for the second content based upon a second latency and a second delay;
wherein the second latency arises over a second content link between the sync server and the second user device;
wherein the second delay is a second user device delay; and
wherein the second user device delay occurs while the second user device processes the second content for presentation to the second user.

8. The system of claim 7,
wherein a second reply received by the sync server from the second user device includes:
 a second networktime and a second device time;
  wherein the second network time indicates when a second ping sent by the sync server was received by the second user device; and
 wherein the second device time indicates when the second user device decoded a second data packet provided with the second ping; and
wherein the sync server executes non-transient computer instructions for:
 determining the second latency based upon the second network time; and
 determining the second user device delay based upon the second device time.

9. The system of claim 8,
wherein the first data packet and the second data packet include an identical MPEG encoded video content segment.

10. The system of claim 9,
wherein the sync server executes non-transient computer instructions for:
 determining the first latency at multiple first bit rates; and
 determining the second latency at multiple second bit rates.

11. The system of claim 10,
wherein the sync server executes non-transient computer instructions for:
 determining the first user device delay at multiple first bit rates; and
 determining the second user device delay at multiple second bit rates.

12. The system of claim 11,
wherein the sync server executes non-transient computer instructions for:
 determining a first minimum quality level for presentation of the first content, at the multiple first bit rates, based upon the first latency and the first device delay; and
 determining a second minimum quality level for presentation of the second content, at the multiple second bit rates, based upon the second latency and the second device delay.

13. The system of claim 12,
wherein the content source is the first user device.

* * * * *